Patented May 13, 1941

2,241,487

UNITED STATES PATENT OFFICE 2,241,487

CATALYTIC OXIDATION OF KETONES

Ober C. Slotterbeck, Elizabeth, N. J., assignor to Standard Oil Development Company, a corporation of Delaware No Drawing. Application February 18, 1939, Serial No. 257,141

7 Claims. (Cl. 260—541)

This invention relates to an improved process for the catalytic oxidation of ketones.

It is shown in the United States Letters Patent 2,005,183, granted June 18, 1935, to Flemming and Speer that ketones are oxidized to carboxylic acids by subjecting ketones corresponding to the general formula $RCOR_1$, in which R denotes an alkyl, cycloalkyl, aralkyl or aryl radical and $R_1$ an alkyl, cycloalkyl or aralkyl radical, or in which R and $R_1$ are connected with each other as members of a non-aromatic ring system, to oxidation in the liquid phase by means of oxygen-containing gas, i. e., oxygen or a gas containing oxygen, such as air or air enriched in oxygen, for example containing 50% of oxygen, in the presence of oxidation catalysts.

Ketones are in general quite stable and are resistant to oxidation. While the aforesaid patent describes catalysts which are effective in promoting the oxidation of ketones to valuable products, still the rate of oxidation is quite slow, and the process is expensive because of the resulting low capacity of the equipment. It has now been found that the oxidation of ketones as described in the aforesaid patent can be greatly increased in rate and efficiency by the use of mixtures of catalysts, by which high yields of carboxylic acids are obtained at a greatly increased rate of reaction, thereby affording great advantages in increased capacity and reduced operating costs for this process.

This invention comprises conducting the oxidation of ketones in the presence of a mixture of one or more of the oxidation catalysts described in the said Flemming and Speer patent, and a second catalyst including the metals having an atomic weight between about 6 and 40 and the compounds of such metals, the compounds of the alkali and alkaline earth metals being especially preferred. A plurality of such second catalysts may also be used. Examples of this second group of compounds are the alkali metal and alkaline earth metal oxides, hydroxides, carbonates and acid carbonates, also organic compounds of such metals as the soaps of fatty acids and the salts of other organic acids, also metal alcoholates and metallo-organic compounds in which an organic radical is connected to the said metal by a carbon to metal linkage. Salts of the said metals with inorganic acids and other inorganic compounds of these metals are also included; it being preferred, however, that such compounds be free of metals of groups IV to VIII of the periodic table of elements. Examples of preferred compounds of this second group are sodium oxide, sodium hydroxide, soda ash and the corresponding potassium compounds, also the carbonates and bicarbonates of sodium and potassium and the sodium and potassium salts of fatty acids, such as the acetates, butyrates, palmitates, oleates, stearates and the like.

The said second group of compounds appear to act as promotors for the ketone oxidation catalysts, as it has been observed that the oxidation proceeds at a much more rapid rate, with greater production of acid, when a mixture of the oxidation catalyst and a compound of the second group is used, than when only the oxidation catalyst is used. Examples of such catalyst and promotor combinations are one part manganese acetate and about two parts sodium acetate, one part cobalt nitrate and about ten parts sodium acetate, one part manganese butyrate and about two parts potassium acetate, one part manganese nitrate and about five parts calcium carbonate.

The following example illustrates advantages of the invention described herein:

*Example I*

Comparative tests on the oxidation of methyl ethyl ketone were conducted with different catalysts in the same apparatus and under similar operating conditions. In each case a solution in glacial acetic acid of freshly distilled methyl ethyl ketone (1.5 to 3%) and the catalyst (0.5%) was placed in a tall, narrow reaction vessel packed with glass Raschig rings and heated to the operating temperature. Oxygen was then passed through the solution at such a rate that it was continually in excess, about 25 to 50% being unabsorbed, and then through a reflux condenser, a dry ice trap and a scrubber containing aqueous sodium bisulfite. Additional ketone was supplied continually to the bottom of the reaction vessel and reaction products were withdrawn from the side near the top of the vessel so that both the ketone concentration and the liquid level in the reactor remained practically constant. During the run samples of both the liquid product and the exit gases were taken periodically to determine the concentration of ketone in the liquid product and also the concentration of oxygen, carbon dioxide and carbon monoxide in the gaseous products. At the completion of each run the concentration of crude acids, calculated as acetic acid, and of methyl ethyl ketone was determined on the total liquid product. The results of comparative runs A, using manganese acetate, and B, using manganese acetate and sodium acetate, are presented in the following table:

*Direct oxidation of methyl ethyl ketone at atmospheric pressure*

|  | Run No. | |
| --- | --- | --- |
|  | A | B |
| Catalyst | $Mn(Ac)_2$ | $Mn(Ac)_2+Na(Ac)$ |
| Catalyst concentration, per cent | 0.5 | 0.5+1.2 |
| Temperature °C | 103–104 | 103–104 |
| Duration of run hours | 6.33 | 5.75 |
| $O_2$ rate liter/hr | 8 | 10 |
| Average M. E. K. Conc., per cent | 2.2 | 2.8 |
| Crude acid produced mols | 0.63 | 1.43 |
| Mol % of M. E. K. reacted | 59 | 75.5 |
| Mol % yield of crude acids (based on M. E. K. reacted) | 90 | 84 |
| Crude acid mols/hr | 0.10 | 0.25 |

A comparison of run B with run A demonstrates that the rate of oxidation with manganese acetate and sodium acetate is more than double the rate with manganese acetate catalyst alone, as indicated by the mols of crude acid produced per hour.

Other acids, such as propionic acid, are also prepared by oxidation of suitable ketones with the improved catalysts of this invention. For example, propionic acid is formed by oxidation of methyl n-propyl ketone, ethyl n-propyl ketone, diethyl ketone, and mixtures of such ketones.

The present invention is not limited to the specific ketones or reaction conditions described above, for the improved catalyst combinations of this invention are suitable for use in the oxidation of ketones generally under the conditions described in the said Flemming and Speer patent. For example, the reaction is generally carried out at temperatures below about 120° C., as temperatures above about 130° C. have been found to increase substantially the losses of ketones to carbon monoxide and carbon dioxide, with corresponding reduction in yield of acids. The amount of the oxidation catalyst ranges from about 0.01% to 10% or more, by weight of the ketone undergoing oxidation, about 0.1 to 1% being generally used. The second group of catalytic compounds, or catalyst promotors, which are added according to the present invention are used in amounts generally somewhat greater than the amount of the first catalyst, for example about 2 to 10 times the weight of the first catalyst, although larger and smaller amounts may also be used.

In some instances it may be observed that the oxidation rate decreases after the catalyst has been in use for some time. This may be due either to reduction in the catalyst concentration by withdrawal of liquid from the reaction zone, or to some decrease in the initial activity of the catalyst. In either case, the addition of small amounts of fresh catalyst from time to time to the reaction vessel maintains the oxidation rate at a substantially constant high level.

This invention is not to be limited to any specific examples or theoretical explanations presented herein, all such being intended solely for purpose of illustration, but is limited only by the following claims in which it is desired to claim all novelty in so far as the prior art permits.

I claim:

1. Process for the catalytic oxidation of ketones which comprises subjecting a ketone corresponding to the general formula $RCOR_1$, in which R is a member of the group consisting of alkyl, cycloalkyl, aralkyl and aryl radicals and $R_1$ is a member of the group consisting of alkyl, cycloalkyl and aralkyl radicals, said ketone being a member of the group consisting of ketones in which R and $R_1$ are not connected with each other and ketones in which R and $R_1$ are connected with each other as members of a non-aromatic ring system, to oxidation in the liquid phase by means of a gas containing molecular oxygen, in the presence of an oxidation catalyst and of a promoter therefor comprising a basic-acting compound of a metal having an atomic weight between about 6 and 40.

2. Process for the catalytic oxidation of ketones which comprises subjecting a ketone corresponding to the general formula $RCOR_1$, in which R is a member of the group consisting of alkyl, cycloalkyl, aralkyl and aryl radicals and $R_1$ is a member of a group consisting of alkyl, cycloalkyl and aralkyl radicals, said ketone being a member of the group consisting of ketones in which R and $R_1$ are not connected with each other and ketones in which R and $R_1$ are connected with each other as members of a non-aromatic ring system, to oxidation in the liquid phase by means of a gas containing molecular oxygen, in the presence of an oxidation catalyst and a basic-acting compound of an alkali metal.

3. Process according to claim 2 in which the said second compound is an alkali metal salt of a fatty acid.

4. Process according to claim 2 in which the said second compound is an alkaline oxy compound of an alkali metal.

5. Process according to claim 2 in which the said catalyst comprises manganese acetate and sodium acetate.

6. In a process for oxidizing a ketone having the carbonyl group connected to at least one aliphatic carbon atom, the improvement comprising oxidizing said ketone with a gas containing molecular oxygen, in the liquid phase, in the presence of an oxidation catalyst and a basic-acting compound of an alkali metal.

7. In a process for oxidizing a ketone having the carbonyl group connected to at least one aliphatic carbon atom, the improvement comprising oxidizing said ketone in the liquid phase with a gas containing molecular oxygen, in the presence of a catalyst comprising a salt of manganese and of a promoter therefor comprising a basic-acting compound of a metal having an atomic weight between about 6 and 40.

OBER C. SLOTTERBECK.